D. BOYLE.
Refrigerating Device.
No. 237,953.  Patented Feb. 22, 1881.
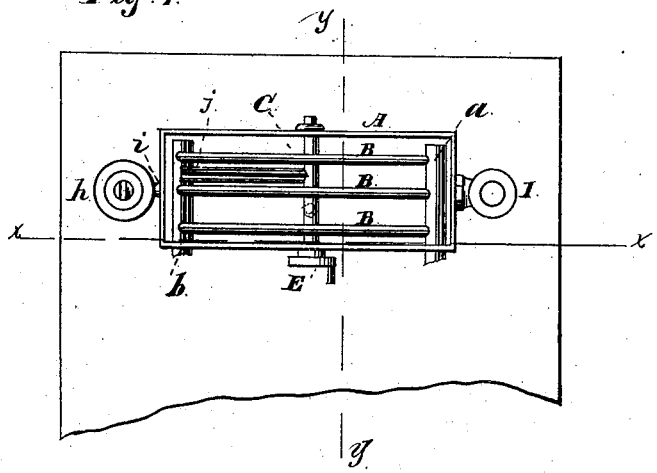
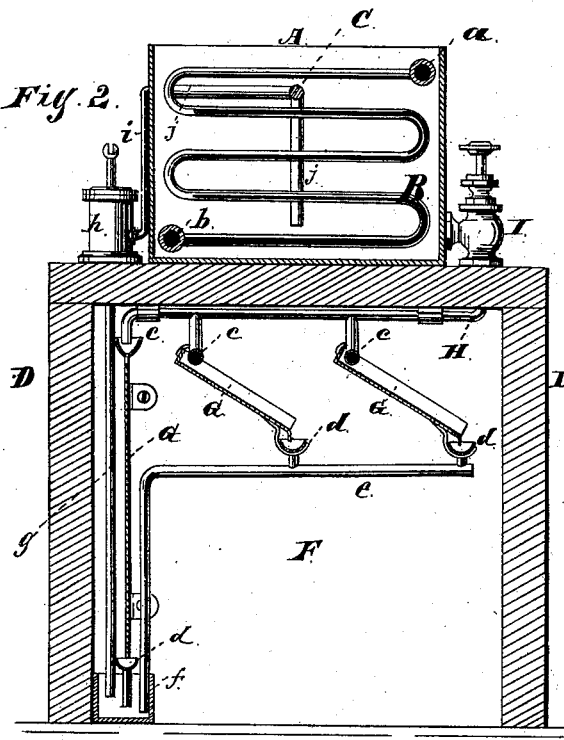 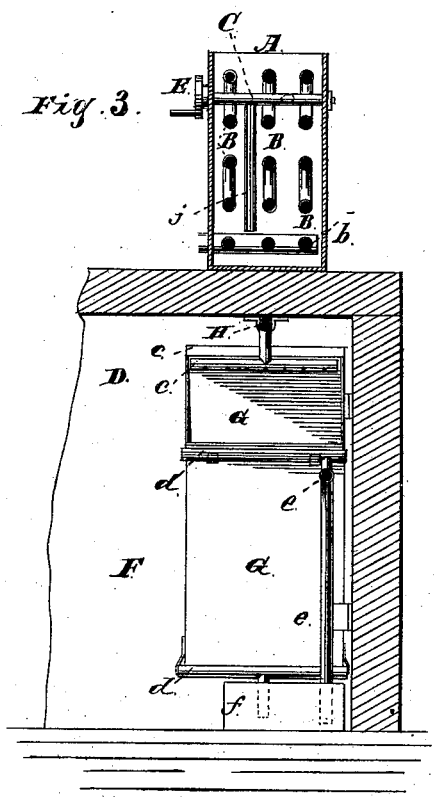
Witnesses:
Inventor:
David Boyle

UNITED STATES PATENT OFFICE.

DAVID BOYLE, OF CHICAGO, ILLINOIS.

REFRIGERATING DEVICE.

SPECIFICATION forming part of Letters Patent No. 237,953, dated February 22, 1881.

Application filed November 4, 1879.

*To all whom it may concern:*

Be it known that I, DAVID BOYLE, residing at Chicago, in the county of Cook and State of Illinois, and a subject of the Queen of Great Britain, have invented certain new and useful Improvements in Refrigerating Machines or Devices for Cooling Rooms, &c., of which the following is a full description, reference being had to the accompanying drawings, in which—

Figure 1 is a top or plan view; Fig. 2, a section on line $x\ x$ of Fig. 1; Fig. 3, a section on line $y\ y$ of Fig. 1.

This invention relates to the cooling of rooms, vaults, receptacles, or other places where it is desired to have a low temperature for any purpose, and has for its object the extraction of any excess of moisture or other impurities which might injure or affect the substance or matter in the place to be cooled, and the production and maintaining of a free and perfect circulation, and consequently a more rapid and efficient cooling or refrigerating; and its nature consists in the novel combination and arrangement of a supply-tank holding a body of water or other refrigerating medium, a coil through which a refrigerant can be passed for cooling the water or other medium, and an agitator the arms of which are so located as to operate between the coils and serve the purpose of producing a stirring or agitation of the water or other medium in the supply-tank; in providing one or more perforated pipes or troughs, through which the water or other refrigerating medium can be discharged upon suspended metallic plates, the discharge being in the form of thin sheets or jets; in providing suspended plates to receive the water or other refrigerating material and allow it to descend on the surface, so as to produce a more rapid cooling; in providing one or more pipes for conducting the water or other refrigerating medium from the supply-tank to the perforated pipes or troughs to be discharged upon the suspended metallic plates; in providing waste troughs and pipes to receive the water or other refrigerating medium from the suspended metallic plates and conduct it to a receptacle, from whence it can be returned by a pump to the supply-tank to be again cooled and discharged; and in cooling or refrigerating, by discharging the water or other refrigerating medium in thin streams or jets on metallic surfaces suspended within the room, air, or other place to be cooled.

In the drawings, A represents the supply-tank for the water or other refrigerating medium; B, the coils of pipe; C, the agitator; D, the walls of a room, vault, box, or other receptacle; E, the crank or wheel for operating the agitator; F, a section of a room; G, the suspended metallic plates; H, a pipe leading from near the bottom of the supply-tank to the perforated or jet pipes or troughs; I, a stop-valve; $a$, the supply-pipe for the coils; $b$, the discharge-pipe for the coils; $c$, the perforated tubes or troughs; $d$, the waste troughs or pipes to receive the water or other medium from the metallic plates; $e$, the pipe leading from the waste troughs or pipes; $f$, the receptacle for the waste-water or other medium; $g$, the pipe leading from the receptacle to the pump; $h$, the pump; $i$, the pipe for returning the water or other medium to the supply-tank.

The tank A may be made of any suitable material, and of a size and form to suit the location and the desired use. As shown, it is located above the room or place to be cooled; but it may be located below or at either side. It will be found convenient frequently to locate it below, so that the water or other medium flow can be regulated by the pump, in which case the pipe $i$ will be discharged directly into the circulating-pipe H.

The coils B are located in the tank A in the form of construction shown, and have their vertical lines placed a short distance apart, so as to leave a space between each coil. These coils B may be of any construction suitable for the purpose of carrying the refrigerant material.

The agitator C has a central shaft located near the top of the tank A, as shown, to avoid packing, or providing stuffing-boxes for its journals, from which extend suitable blades $j$, so arranged as to enter the spaces left between the coils B. This agitator has a rocking movement given to it by the wheel or crank E, so that the beaters or blades $j$ will stir or agitate the water or other medium in the supply-tank, and thereby insure a more rapid cooling from the refrigerant in the coils B.

The pipe H is arranged along or attached to the ceiling or upper portion of the room or other place, and leads from the supply-tank to the place or substance to be cooled, and at suitable or convenient distances it is connected with pipes c, which pipes are perforated so as to discharge small jets or streams of water or other refrigerating medium. These pipes c may be made in the form of troughs having suitable perforations for the discharge.

The metallic plates G are suspended so as to receive the discharge from the perforated pipes or troughs c on one or both sides. These plates may be set at an angle when there is but little height, in which case the discharge from the pipes or troughs will be on their upper face; but when the height is sufficient they may be placed vertical, in which case the discharge from the pipes or troughs c may be on both faces of the metallic plates.

In the form of construction shown troughs or receptacles d are located at the lower end or edge of the plates G, to receive or catch the water or other medium which is conducted by the pipe e, connected with the troughs d, to the receptacle f, from whence it can be returned to the supply-tank through the pipe g, pump h, and pipe i, to be again cooled and used.

When it is desirable to keep the place or articles dry the troughs, waste-pipe, and waste-receptacle are used; but when keeping dry is not a necessity these devices may be omitted, though, if desired, the waste-receptacle may be used, located below or on a line with the floor or bottom, so that the water or other medium can be returned to an elevated supply-tank; but if the supply-tank is below the level of the floor or bottom the waste-receptacle can be omitted entirely, and the water or other medium be discharged directly into the supply-tank.

With an elevated tank, as shown, the discharge or flow from the tank into the pipe H is regulated by a cut-off valve, I, of suitable construction, and when the tank is placed below the flow will be regulated by the pump h, which is operated by any suitable means.

The cooling agent or refrigerant is introduced into the coils B by suitable supply-pipes a, and the coils can be emptied by means of a suitable discharge-pipe, b. The cooling agent or refrigerant may be a volatile liquid, expanding gas, a cold liquid, or other substance or medium used for that purpose. When a temperature lower than the freezing-point is required a circulating medium can be formed by a solution of salt, caustic soda, chloride of calcium, or other well-known agent or substance used for this purpose, which is uncongealable above zero Fahrenheit.

By discharging the water or other refrigerating medium onto suspended metallic plates in thin streams or jets the principle of cooling such plates for the purpose of producing a refrigeration or cooling of rooms, air-vaults, or for any other purpose is efficiently carried out, and a convenient means is provided by which the principle can be utilized, the plates furnishing a large surface for refrigerating purposes, which is kept cool by a small number of jets. By this arrangement the air is cooled, and, falling down, a circulation is maintained, and the air is also relieved from any excess of moisture and purified by the circulating medium or liquid absorbing carbonic acid, ammonia, and other gases. The number of metallic plates used will depend on the size of the room, a sufficient number to produce the required cooling effect being provided, and the surface of such plates may be equal to one-half of the superficial area of the ceiling.

I do not claim, broadly, any device for cooling apartments involving, broadly, the combination of a sprinkler and a shield or table upon which the water is sprayed; nor do I claim any device for cooling a chamber by applying refrigerated water to its exterior or outer surface. But my devices differ from those heretofore used in this, that I am enabled to control an amount of the flow of water or to stop it, that I am able to apply my devices to the inside of a room without taking valuable space and without wetting the room, as they are up out of the way, and each plate has its own supply and waste pipes, so that the number may be increased or diminished without affecting the others; and, as the main circulation of air comes against the dry side of the water-plates, moisture is taken out instead of being imparted to it; and, as the air-cooling devices are located overhead, where the rising heated air is found, it comes in contact with the plates, and, being perfectly free to circulate around them, a more rapid action is had and a more uniform temperature is maintained.

In my device the spray does not act directly upon the air, but is only used for producing a thinner film of water than that produced by a slit; but a slit may be used where the quantity of water used is not regarded.

What I claim as new, and desire to secure by Letters Patent, is—

1. The tank for the refrigerating medium and the circulating-pipe leading therefrom, provided with a valve and having projecting perforated or slotted tubes, in combination with one or more plates located within the cooling-chamber, and suitable troughs for conveying away the waste water, said tubes discharging the refrigerating medium in thin sheets upon the plates, substantially as specified.

2. The combination of a refrigerating-tank having a refrigerant coil located therein, with the pipe H, perforated pipes or troughs, metallic plates, and troughs d, substantially as and for the purposes specified.

DAVID BOYLE.

Witnesses:
O. W. BOND,
F. F. BRUNS.